May 2, 1939.  C. P. WALKER  2,156,519
MEANS FOR MEASURING THE LOCATION OF OBSTRUCTIONS IN WELLS
Filed Sept. 7, 1937  2 Sheets-Sheet 1
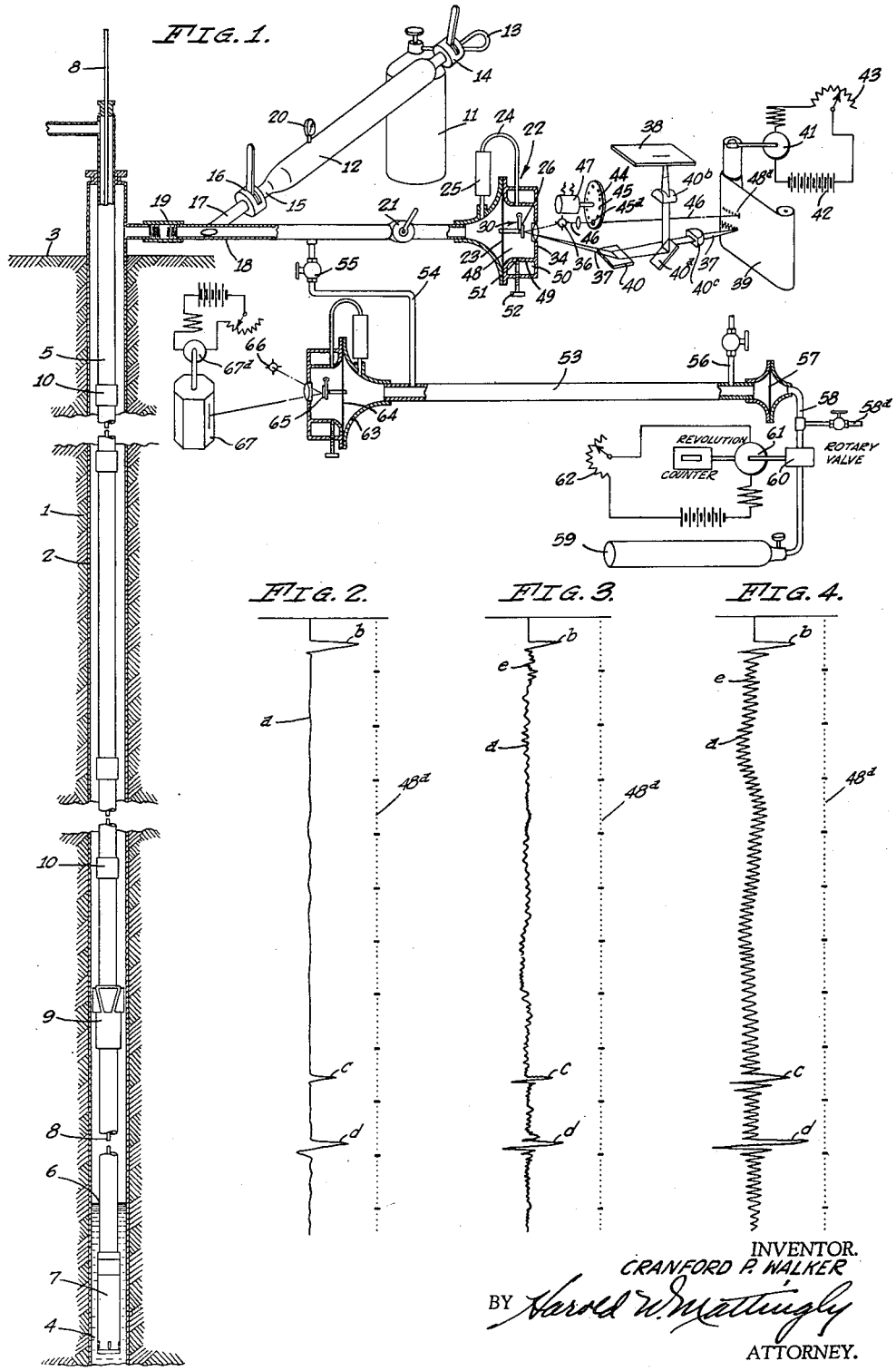
INVENTOR.
CRANFORD P. WALKER
BY Harold W. Mattingly
ATTORNEY.

May 2, 1939. C. P. WALKER 2,156,519
MEANS FOR MEASURING THE LOCATION OF OBSTRUCTIONS IN WELLS
Filed Sept. 7, 1937 2 Sheets-Sheet 2

INVENTOR.
CRANFORD P. WALKER
BY Harold W. Mattingly
ATTORNEY.

Patented May 2, 1939

2,156,519

UNITED STATES PATENT OFFICE 2,156,519

MEANS FOR MEASURING THE LOCATION OF OBSTRUCTIONS IN WELLS

Cranford P. Walker, San Marino, Calif.

Application September 7, 1937, Serial No. 162,699

17 Claims. (Cl. 181—0.5)

My invention relates to devices for measuring the location of obstructions in deep wells, such as oil wells, and has particular reference to apparatus for determining the location below the ground surface of the liquid level in the well or the location of tools, pipe sections, couplings or other devices which constrict the well bore.

During the active life of an oil well it is desirable from time to time to determine the location of the fluid level within the well for the purpose of determining the type of pumping apparatus most desirable to be used, determining the rate of flow of oil into the well, and for making other determinations desirable in the most efficient operation of the well.

Prior methods of determining the location of the fluid level or the location of other obstructions in the well have been generally of two types, one in which measuring apparatus has been lowered from the ground surface to determine by the length of cable or line extended into the well the depth or location of the fluid or other obstructions encountered by the instrument as it is lowered. Among devices to be lowered into the well is also included a pressure recorder which may be lowered into the well on a wire, the length of which is metered to determine the static pressure in the well at different levels, a variation of which includes a pressure recorder with a clock driven chart lowered on the bottom of the pump to obtain a record of the operating pressures or levels of the fluid. A further variation is that of lowering a bailer upon a rope and either measuring the wetted surface of the rope or repeatedly lowering the bailer until it brings up fluid, measuring the length of the line upon such occurrence. The other method is that of producing sound waves in the well and noting the elapsed time between the introduction of the sound and its return as an echo from the surface of the fluid or other obstruction encountered.

Neither of these methods is satisfactory, the first having the disadvantage of requiring the removal of oil flow tubing, sucker rods and other apparatus normally disposed in the well prior to the time the instrument is inserted in and lowered into the well, requiring a considerable length of time both for the removal of such apparatus, the reinsertion of the apparatus, and the making of the actual measurement. The other method is unsatisfactory primarily because of the relatively low intensity or energy which can be employed in the sound wave so that the echo received back is of such low energy as to prevent its accurate detection and, further, little or no distinction is made by reason of such low energy between various types of obstructions encountered by sound wave.

A third method, namely, that of introducing a shock of relatively high intensity into the well, creating thereby a pressure wave which travels through the well, and measuring the elapsed time between the introduction thereof and the echo thereof, to give an indication of the depth of the fluid level and other obstructions, has been introduced, one form being that of creating an explosion in the well, another form being illustrated and described in United States Letters Patent No. 2,047,974, issued to Harold J. Wyatt and Paul E. Lehr on July 21, 1936. This latter method has the desirable characteristic of permitting the employment of relatively high intensity in the wave or impulse produced in the well and it is an object of my invention to improve upon the method disclosed in that patent and to eliminate or materially reduce factors of error encountered in the employment of that method.

Another object of my invention is to provide a device for the measurement of the location of fluid level or other obstructions in a well bore in which the pressure impulse introduced into the well produces an indication both of the fluid level and of the location of other obstructions in the well bore.

Another object of my invention is to provide an apparatus of the character set forth in the preceding paragraph wherein the same pressure impulse introduced into the well to measure the fluid level or the location of other obstructions is employed to determine the velocity of the wave in the particular media encountered in the well.

Another object of my invention is to provide an apparatus as set forth in the preceding paragraph wherein, knowing the location of one or more obstructions, tools or other devices in the well bore, the velocity of the wave within the well bore may be accurately determined from echoes produced thereby and enabling an operator to determine the unknown location of the fluid level by the mere measure of the elapsed time between the introduction of the impulse into the well and the reception of a distinguishable echo from the fluid level, without necessitating introduction of corrective factors or other separate measurement of and determination of the character of the media in the well.

Another object of my invention is to provide an apparatus for determining the location of fluid levels in well bores in which the location of and the number of tubing sections in the well may be determined by the same pressure wave created to measure the depth or the location of the fluid level.

Other objects of my invention will be apparent from a study of the following specifications, read in connection with the accompanying drawings, wherein Fig. 1 is a diagrammatic view illustrating a typical well cross section and the location and character of the apparatus required for determining the fluid level or location of other obstructions in the well in accordance with my method;

Fig. 2 is a diagrammatic view illustrating the type of record or indication which may be made with my method in its simplest application;

Fig. 3 is a diagrammatic view similar to Fig. 2 and illustrating the type of record or indication which may be made with my method but in which echoes produced by intermediate obstructions are not amplified;

Fig. 4 is a diagrammatic view similar to Figs. 2 and 3 and illustrating the type of record or indication which may be made with my method, including the amplification of echoes from intermediate obstructions.

Figure 5:
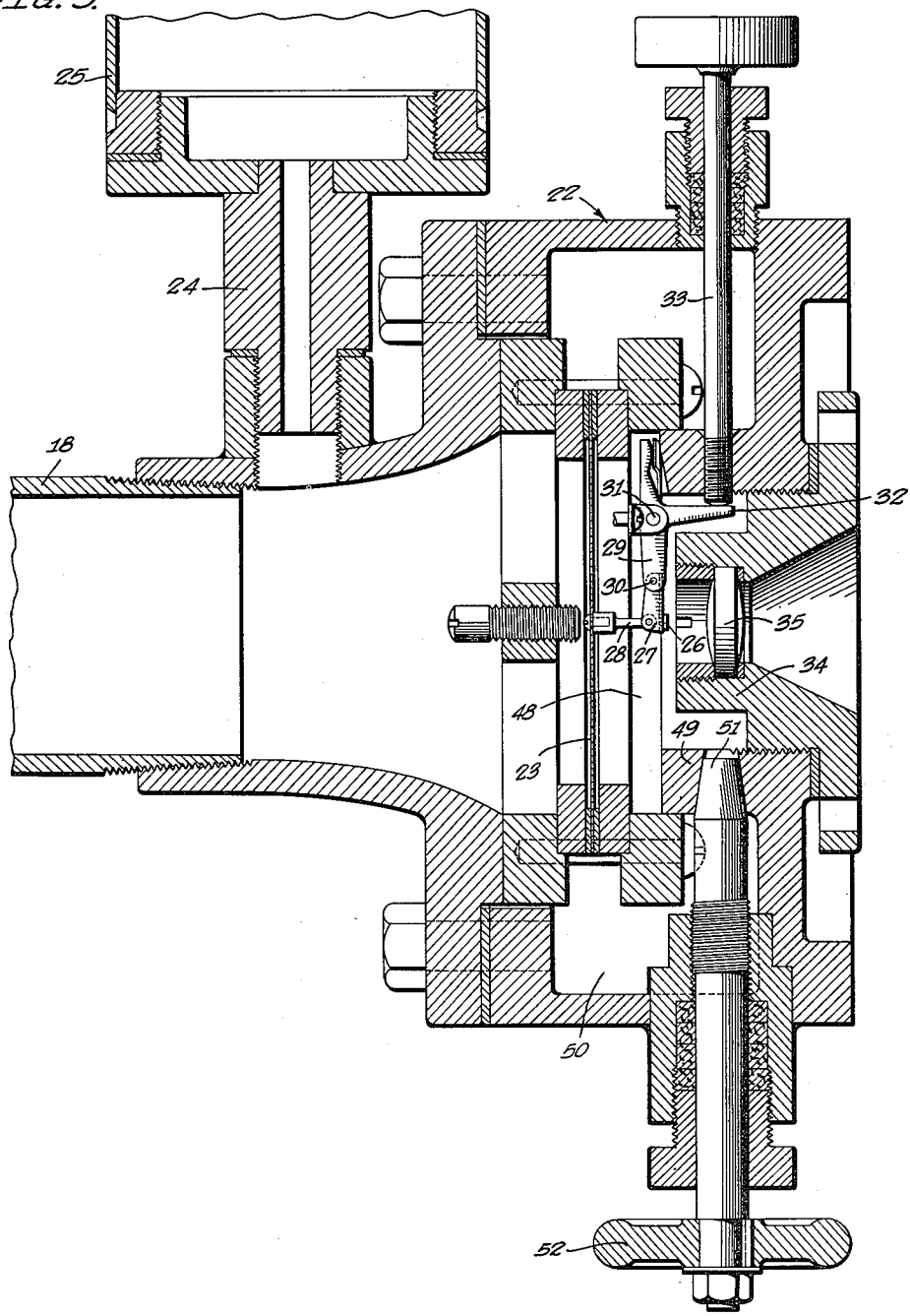
Fig. 5 is a vertical sectional view taken through one form of mechanical pressure responsive device which may be employed in my method.

The method disclosed in United States Letters Patent issued to Wyatt and Lehr, hereinbefore referred to, is briefly that of introducing into a well bore a pressure impulse, either positive or negative, which may have any desired frequency as by the introduction into the well of a quantity of gas of known pressure and volume, the introduction of this impulse into the well producing a wave which will travel down the well until it encounters the fluid surface in the well and then the wave will be reflected and will travel back up the well to the ground surface where the echo or return wave may be detected, the measurement of the elapsed time between the production of the impulse and the arrival at the ground surface of the echo constituting a measure of the location of the fluid level by the simple calculation of the elapsed time multiplied by the rate of travel or the velocity of the wave in the well. In making such calculations, it is correctly assumed that the velocity of the wave will be the same as that of a sound wave. In air at normal temperatures and approximately sea level pressures, this rate would be 1100 feet per second but the gaseous content or media in the well is ordinarily not the same as air and correction must be made for the density, temperature or other characteristics of the particular media encountered in the well, it being well known that the higher the temperature or the lower the density of the gaseous media through which the impulse travels, the greater the velocity of the wave.

In employing the method as set forth in the said patent, an approximation of the fluid level may be readily determined and this approximation or measurement may be determined in a relatively short length of time, without requiring the removal or disturbance of any of the apparatus contained within the well bore. However, to determine the fluid level with considerable accuracy, the rate of travel of the wave in the particular media encountered in any particular well must be known or must be determined since the density, temperature and character of the gaseous media in wells varies in each different oil field and in each individual well. I provide means for readily determining at any particular well the velocity of the wave in that particular well, which may be arrived at as follows:

In Fig. 1 I have illustrated a typical oil well comprising the earth bore 1, usually lined with casing 2 or pipe of relatively large diameter, extending from the ground surface at 3 to the oil bearing sands at 4 where the casing is either perforated or is provided with a perforated liner through which the oil from the sands may enter to the interior of the casing. The casing is, of course, constructed of a plurality of lengths of pipe secured together by couplings or collars in any well known manner. A second pipe or string of pipes extend down through the casing 2, this string of pipe being known as the oil flow tubing, indicated at 5, extending from the ground surface down to a position disposed below the level of the fluid in the well, which is indicated at 6, the lower end of the tubing string 5 having a pump 7 of any desired character located therein. Such pumps are usually operated by means of a string of sucker rods 8 which extend upwardly through the tubing string 5.

It is the common practice to employ in the tubing string 5 a tubing catcher 9 which may be of any of the well known constructions, the tubing catcher being usually located a relatively short distance above the level of the fluid in the well so that should the tubing string break the tubing catcher 9 will grip the casing and prevent complete destruction of the tubing string. One or more of the tubing catchers 9 may be distributed throughout the length of the tubing string 5.

The tubing string 5 is constructed of a plurality of lengths of pipe coupled together by means of collars 10, which collars are usually of somewhat larger outside diameter than the outside diameter of the tubing from which the oil flow tubing is made.

Hence it will be noted that in the ordinary oil well there are a plurality of obstructions, each of which is capable of receiving and reflecting a sound wave or pressure wave passing down through the well, these obstructions including the fluid surface 6, the tubing catcher 9 and each of the collars 10 of the tubing string.

In most wells the length of the tubing string between the ground surface 3 and the pump 4 is known, that is, records are usually kept showing the length of each tubing string section and the number of such sections located within any given well. Particularly, records are usually kept as to the location along the tubing string of the catcher 9 so that by referring to these records an absolute calculation or determination of the distance between the ground surface and the tubing catcher or liner top is known. Hence to determine the location of the fluid level 6, it is only necessary to produce in the well a pressure impulse which will create the low frequency wave, and then translate the echoes received from the well in terms of echo impulses received from the tubing catcher or liner top and from the liquid surface. By comparing the time lapse between the production of the pressure impulse and the receipt of the echo from the tubing catcher with the time lapse between the creation of the pressure impulse and the receipt of the echo from the fluid surface, a positive and accurate measurement of the location of the fluid level may be obtained. That is, if the known location of the tubing catcher is 5000 feet below the fluid surface and it is desired to know the height of the fluid in the well, all that is necessary is to produce a pressure impulse, note or record the echo from the tubing catcher, and note or record the echo received from the fluid surface. The time lapse between the creation of the pressure impulse and the receipt of the echo from the tubing catcher denotes the velocity of the pressure wave in the particular media encountered in that particular well so that by measuring the additional elapsed time between the receipt of the echo from the tubing catcher and the receipt of the echo from the fluid surface, an accurate measurement may be obtained and no compensation need be made for possible errors due to different velocities of waves in different media because the mean velocity of the wave from the ground surface to the tubing catcher and return is exactly the same as the mean velocity of the wave from the ground surface to the fluid surface and return.

The only item which must be provided for is that of producing a pressure wave echo of such magnitude and of such character that the echo from the tubing catcher can be distinguished from the echo received from the fluid surface.

As illustrated in Fig. 1, this distinction may be readily made by providing a suitable source of fluid pressure indicated at 11 which may be a tank, compressor or other source of fluid pressure at any desired value. It follows, of course, that the pressure impulse which must be produced in the well must be at a greater pressure than the pressure of gases in the well so that the pressure source 11 must be capable of delivering a pressure impulse having a considerable differential over the static pressure of gases in the well or flowing therefrom. For example, if the well gases at the surface of the well are at a pressure of 500 pounds per square inch, the source of fluid pressure 11 must be capable of delivering, say, 600 pounds per square inch or more in order to create a pressure impulse of, for example, 100 pounds pressure differential.

The pressure source 11 is illustrated as being coupled to a pressure chamber 12, one end of which is connected as by means of tube 13 and valve 14 to the pressure source 11, while the opposite end of the pressure chamber 12 is connected by means of a nipple 15, a quick opening valve 16 and a nipple 17 to a length of pipe 18 which is in turn coupled as indicated at 19 to the well casing 2. The pressure chamber 12 is preferably provided with a suitable indicating pressure gage 20 by which the pressure within the pressure chamber 12 may be readily measured. Thus for the production of the pressure wave all that is necessary is to close valve 16, open valve 14 and allow pressure to be built up in the pressure chamber 12 to the desired pressure value, say, 600 pounds per square inch. Then the valve 14 is closed and valve 16 opened, allowing an impulse of 600 pounds per square inch to be injected into the well casing (the static pressure in which is, for example, 500 pounds per square inch).

A receiving device for receiving and registering the echoes of the pressure impulse from the various obstructions within the well is illustrated as including the pipe 18 and pressure responsive device coupled thereto through a valve 21 to a diaphragm chamber 22, permitting a flexible diaphragm 23 to be placed into communication with the casing 2 whenever the valve 21 is opened. To control the sensitivity of response of the diaphragm 23 and in order to prevent undue distortion of the diaphragm 23 by the static pressure in the well and to avoid damage which would result therefrom, I prefer to allow the static pressure in the well casing 2 and pipe 18 to be equalized on both sides of the diaphragm 23 as by providing a by-pass 24 providing a restricted passage through which gas pressure in the chamber 22 on one side of the diaphragm may pass to the opposite side of the diaphragm, the filter 25 being interposed in the by-pass if desired to dry out the gas and prevent undue corrosion of the more delicate parts of the device contained in the diaphragm chamber 22. Attached to the diaphragm 23 is a mirror 26, preferably connected as shown in Fig. 5 upon a link 27, one end of which link is coupled by means of a rod 28 to the diaphragm 23. The opposite end of the link 27 is preferably connected to one arm of a bellcrank lever 29, as indicated at 30. The bellcrank lever 29 is pivoted as at 31 to any desired portion of the metal comprising the diaphragm chamber 22, another arm of the bellcrank lever 29 extending as indicated at 32 to be engaged by an adjusting rod 33 so that by operating the adjusting rod 33 the fulcrum point 30 of the link 27 may be varied as desired to properly position the beam on a recording chart.

In the front wall 34 of the diaphragm chamber 22 I mount a lens 35, through which light from a suitable light source 36 may pass into the chamber 22 to be reflected by the mirror 26, the reflected beam 37 passing back through the lens 35, as a ribbon beam which may be reflected or directed upon a ground glass screen 38 and upon a recording chart or strip of sensitized tape 39 to make a permanent record of the path described by the light beam 37. Suitable reflectors, such as indicated at 40, may be employed to direct the beam in any desired direction while a reflector 40a may be interposed in a portion of the ribbon beam 37 to direct a portion thereof upon the screen 38, suitable condenser lenses 40b and 40c being interposed in the beam to draw the same to a point beam upon the screen 38 and tape 39.

Thus as the pressure within the casing 2 is varied as by the pressure wave resulting from the pressure impulse created within the casing 1, the mirror 26 will be moved, the amplitude of its movement representing the amplitude of the pressure variation. As the echo of the pressure impulse from any obstruction within the well is received upon the diaphragm 23, the mirror 26 will be moved in accordance with the amplitude of the echo impulse and will cause the echo impulses to be registered for observation, both by directing the light beam 37 upon the ground glass 38 where the amplitude of the echo may be visually observed and, by directing the light beam 34 upon the recording tape 39, a permanent record of the pressure wave which is created within the casing 2 may be made and this wave or chart will show peaks of varying amplitude, each of which peaks represents an echo from a particular obstruction within the well, either the tubing collars 10, the tubing catcher 9 or the fluid surface 6.

The sensitized strip 39 may be arranged to be driven at any desired speed by means of a variable speed motor 41 coupled to a suitable source of current 42 through a rheostat or other speed adjusting device 43 so that the tape or strip 39 may be driven at variable speeds.

By employing some device which will produce upon the record strip 39 a time lapse measurement, a direct comparison between the path described by the light beam and the lapse of time may be accomplished. I prefer to provide such mechanism including means for producing upon the strip 39 a series of dots or marks, each of which represents a fraction of a second, the line of dots or marks extending substantially parallel to the general direction of the wave chart described by the light beam 37. This may be readily accomplishing by providing a disc 44 having a plurality of openings 45 therein adapted to be rotated in the path of a secondary light beam 46 emanating from the light source 36. The light beam 46 passing through the openings of the disc 44 may be projected upon the same sensitized strip 39 to describe a series of marks thereon, one for each of the openings 45. One of the openings 45a is preferably larger than the remainder so that upon each revolution of the disc 44 a distinguishing mark will be produced. Thus by providing ten openings 45, a series of marks 48a may be produced upon the record strip 39 representing ten equal divisions. The tenth mark being produced by the large opening 45a is of greater length or of greater size or in some other manner distinct from the remaining nine marks. By providing the disc 44 with any suitable time mechanism such as a synchronous motor 47, the marks produced upon the charts will represent lapse of time; for example, each mark representing $\frac{1}{10}$ of a second while the space between the distinct marks will represent lapses of one second each.

Due to the fact that the depth of wells varies considerably and, further, due to the fact that conditions of obstruction or constriction of the space between the well casing 2 and the tubing string 5 varies considerably in different wells, the same pressure differential cannot be used successfully in all wells and it is necessary to vary the pressure impulse through considerably wide limits, dependent upon the conditions encountered at a particular well. For this reason I prefer to direct a portion of the beam 37 upon the ground glass screen 38 so that by firing one charge of gas pressure into the well and observing the path described by the light beam, a determination of whether or not the correct pressure impulse is being used may be made. For example, one pressure impulse which is estimated to be correct for a given well may not produce a sufficient fluctuation in the echo waves received from the tubing catcher and the fluid surface, and a higher pressure or greater quantity of gas must be used in order to create the desired impulse. Thus by observing the effect of a succession of pressure impulses liberated into the well, the person making the survey will be able to determine which of the echoes rebounds from the tubing catcher and which of the echoes rebounds from the fluid surface.

The pressure wave velocity in different wells varying through wide limits, it is desirable to provide some regulation controlling the sensitivity of response of the diaphragm 23 to pressure variations and also to control the sensitivity of the diaphragm to distinguish between echoes from different obstructions in the well. In some surveys it may be desirable to render this diaphragm more sensitive than in making surveys of other wells under other conditions, particularly for the purpose of allowing the amplitude of movement of the light beam in response to collar echoes to be substantially the same in the surveying of different wells, and I provide a ready means for varying the sensitivity of response of the diaphragm 23 by providing in the pressure chamber 22 two distinct chambers or compartments. One of these compartments or chambers 48 may be formed centrally of the diaphragm chamber 22 as by providing an annular division wall 49, the chamber 48 being disposed on the forward side of the diaphragm 23 and constituting a chamber of fixed volume. The second of these chambers 50 may be provided between the annular wall 49 and the exterior wall of the diaphragm chamber 22, the volume of this chamber being relatively great as compared with the volume of chamber 48. By providing an orifice 51 in the wall 49 intercommunicating chambers 48 and 50 and providing a valve 52 for regulating the effective size of this orifice, the effective volume of the chamber communicating with the forward face of the diaphragm 23 may be varied in small increments so that the diaphragm 23 may be so regulated as to respond with varying degrees of sensitivity.

The typical desired configuration of the path described by the light beam 37 is indicated in Fig. 2 wherein $a$ represents the path described by the light beam as a result of the pressure wave created by a discharge of gas from the chamber 12 into the well casing. From an inspection of the line $a$, it will be noted that this line is a relatively straight but somewhat wavy line, having distinct peaks at $b$, $c$ and $d$. The peak $b$ is that which will be produced by the deflection of the diaphragm 23 when the impulse of gas from the chamber 12 is liberated into the casing 2. At a predetermined time thereafter, dependent upon the velocity of the wave in the particular well, a peak $c$ will be produced as a reflection from the tubing catcher 9, while at a predetermined time thereafter an additional peak or series of peaks will be produced at $d$ as a reflection of the wave from the fluid surface.

Thus by observing the effects of a series of pressure impulses of different intensity or pressure, the operator may determine which impulse is most desirable to produce the distinctly recognizable and differentiatable peaks $c$ and $d$, allowing him to differentiate between echo from the tubing catcher and the echo from the fluid surface. As hereinbefore stated, knowing the depth or location of the tubing catcher 9, the comparison of the elapsed time between the peaks $b$ and $c$ and the elapsed time between the peaks $b$ and $d$, an accurate determination of the fluid level may be produced.

After the most desirable pressure impulse has been determined, the motor 41 may be set into action and a permanent record of the path described by the light beam may be made upon the sensitized film 39 with assurance that the various peaks $b$, $c$ and $d$ will be readily distinguishable upon the diagram so produced.

As will be observed from an inspection of Fig. 2, the diagram on the strip 39 also shows the plurality of spaced dots or other means of indicating elapsed time, such series of dots being indicated at 48a.

Having made a diagram as indicated in Fig. 2, a direct measure and determination of the fluid depth may be achieved. Also it will be observed that by selecting impulses of the desired magnitude, reflections from other obstructions in the well may be noted and recorded, thus assisting in the location and determination of other restrictions as well as a measurment of the fluid level.

For example, each of the collars 10 of the tubing string will produce a distinct echo differentiable from the echoes from other sources. This allows the accurate measurement of the fluid level in a well where, by reason of failure to keep records or loss of records, the location of the tubing catcher is not known or wherein the catcher is submerged or is omitted. For example, in some wells tubing has been drawn out and replaced by other tubing and no record has been made of the lengths of tubing drawn out or the lengths of each section drawn out or the lengths or number of tubing section employed to replace them so that to merely compare the time distance between the peaks b and c would not give a true indication of the velocity of the wave in the particular well. However, if it is reasonably assured that each of the tubing lengths is approximately the same, and the usual practice in oil wells is to employ tubing lengths in a given well, all of which are the same, an indication of the number of tubing lengths located within any given well, multiplied by the average length of a tubing section, will give a true measure of the location of the tubing catcher or the location of the pump or other device which constitutes an obstruction in the well. Thus, for example, by selecting a desired pressure impulse, by comparison of a succession of pressure impulses and the waves produced thereby, upon the ground glass 38, a wave or line of the character indicated at a in Fig. 3 may be produced wherein, though a is still wavy, it is produced by a series of peaks e. By counting the number of these peaks, each of which represents a reflection back from a collar 10, the number of lengths of tubing between the peaks b, c and d may be determined.

However, in actual practice there are so many other possible disturbances in the well as to create peaks similar to e which are not readily distinguishable therefrom and I prefer to provide a means for tuning out other vibrations, harmonics or other disturbances so that the peaks e will accurately represent only reflections from the collars 10.

As will be understood, the introduction into a sound wave or multiplicity of sound waves of another wave tuned with one of the waves, produces a beat or amplification of certain of these waves differing in frequency from the first wave will be damped out. By selecting the correct length for the pipe 18, that is, by selecting the correct distance between the casing 2 and the diaphragm 23, a tuned wave may be produced which will effect the movements of the diaphragm 23. Since it is desired to count the number of tubing collars, all that is necessary is to lengthen or shorten the pipe 18 until it is tuned to one of the harmonics of the impulses or echoes produced by the collars 10. From experience it has been found that selection of the pipe 18 of approximately one-third of the length of a section or joint of the tubing 5, a third harmonic is produced which beats with the impulses echoed from the tube collars 10 to produce magnified or amplified peaks e and permits the ready distingushing of the impulses produced by the collars 10 from other impulses.

I prefer, however, to employ in the length of the pipe 18 an adjustable coupling 19 which allows the accurate lengthening or shortening of the pipe 18 until, by observing the path of the light beam upon the ground glass 38, a distinct pattern is made represented by the line a on Fig. 4, in which each of the intermediate peaks e is amplified as indicated in Fig. 4 so that it is readily recognizable.

The adjustment of the coupling 19 should be made until, with a given pressure impulse, a uniform deflection of the mirror 26, that is, a uniform amplitude of the peaks e, is achieved, and by observing this upon the ground glass 38 the operator will note when the pipe 18 is of such length as to be "tuned" with the tubing lengths.

Thus, even though the location of the tubing catcher is not known, if the average length of tubing section is known, the production upon the strip 39 of a diagram such as shown in Fig. 4 allows the counting of each of the collars 10 and a clear understandable record is made of the length of tubing string between the impulses b, c and d, permitting the quick and accurate location and determination of the exact level of the fluid in the well.

Where the tubing lengths are not known and where the location of the tubing catcher is not known, or where the catcher and liner top are submerged, a quick and ready method of determining the velocity of the pressure wave through the particular gaseous medium encountered in a particular well may be made by employing an elongated tube or pipe 53 coupled as by means of a short pipe 54 to the pipe 18 and controlled by a valve 55 in such manner as to permit gas from the casing 1 to flow through the pipe or tube 53, thus providing in the pipe 53 an atmosphere corresponding to the atmosphere or gaseous medium in the casing 1. An open exhaust pipe 56 leads from the opposite end of pipe 53 open to the atmosphere or connected to a gas flow line so that the pressure within the pipe or tube 53 will remain substantially constant as of the value of the gas in the casing 1. Near one end of the tube 53, a diaphragm 57 may be provided and arranged to be vibrated at any desired frequency as by coupling the diaphragm 57 by a pipe 58 open to the atmosphere at 58a, to a source of fluid pressure, such as compressed air, indicated at 59. A rotary valve 60 is interposed in the pipe 58 and arranged to be driven by means of a variable speed motor 61 regulated as to speed by means of a variable speed motor 61 regulated as to speed by means of a suitable rheostat or other controlling device 62 so that by rotating the motor 61 at any speed a series of pressure impulses will be created in the pipe 58, and will beat upon diaphragm 57 to create a pressure wave in the tube or pipe 53 of known frequency, the frequency being variable by varying the speed of motor 61.

At the opposite end of the pipe 53 I couple a pressure responsive device which may be constructed in the same manner as the diaphragm chamber 22 and diaphragm 23 hereinbefore described. This pressure responsive device is illustrated at 63 coupled directly to the end of the pipe 53, the diaphragm 64 of which receives the impulses transmitted through the pipe 53 to vibrate in response thereto and to move a mirror 65 in the same manner as was described with reference to the mirror 26. The mirror 65 reflects a light beam from a suitable source 66 upon a polygon of mirrors 67 revolved by means of an adjustable speed motor 67a at a speed synchronous with the speed of the motor 61 so that the amplitude and uniformity of the vibrations of the diaphragm 64 may be visibly observed.

As is well known in the art, each gaseous medium, variable as to density, temperature, etc., is resonant to pressure waves or sound waves of predetermined frequency. Thus by varying the speed of operation of the motor 61 until the pressure impulse created by the diaphragm 57 makes one round trip (or multiple thereof) to the diaphragm 66 and back to the diaphragm 57 in time to just synchronize with the next impulse created by the diaphragm 57, the pattern described by the beam of light on the mirrors 67 will show uniform amplitude, and noting the frequency of the impulses produced upon the diaphragm 57 (that is, noting the speed of the motor 61) the velocity of the sound through this particular gaseous medium may be readily determined by comparing this frequency with the frequency at which resonance is achieved at the pipe 53 with air in it.

It will therefore be observed that I have provided a method of determining the location of obstructions in wells and accurately locating and measuring the fluid level in a well without the necessity of removing any of the apparatus from the well, the entire measurement and determination being accomplished in a relatively short time.

It will be understood by those skilled in the art that the creation of pressure impulses within the well may be accomplished by decreasing the pressure in the well instead of admitting a charge of gas from the pressure tube 12 into the well. For example, if the pressure in the well is relatively high, the valve 14 in the pressure chamber may be closed and the valve 16 opened, allowing the pressure in the well to build up within the impulse chamber 12. Then by operating valve 14, allowing the pressure within the chamber 12 to rapidly discharge, a pressure impulse may be created within the well which acts in the same manner as hereinbefore described for the introduction of pressure from the tank or other source 11.

It will also be understood that if desired special constrictions may be placed in the well for future measurements of the fluid level therein to take the place of the tubing catcher 9. Such constrictions could comprise a closed cylinder of pipe surrounding and attached to one of the tubing sections when the tubing is run into the well and by noting and recording the location of such constriction, the future measurements of the fluid level by my pressure impulse method can be readily determined, employing the reflection of the wave from the restricting member in place of the reflection from a tubing catcher 9 or other restriction in the well.

While I have shown and described the preferred embodiment of my invention, I do not desire to be limited to any of the details of construction shown or described herein, except as defined in the appended claims.

I claim:

1. In an apparatus for determining the location of an obstruction in a well having therein a string of assembled tubing sections interconnected with each other by coupling collars, means communicating with said well for creating a pressure impulse in said well, echo receiving means including a pressure responsive device exposed to said well for receiving pressure impulses from the well and for measuring the lapse of time between the creation of the impulse and the arrival at said receiving means of the echo from said obstruction, and means associated with said pressure responsive device for tuning said receiving means to the frequency of echoes from the tubing collars of said tubing sections to clearly distinguish the echoes from said couplings from each other.

2. In an apparatus for determining the location of an obstruction in a well having a string of assembled tubing sections therein, means communicating with said well for creating a pressure impulse in said well, a pressure responsive device for receiving pressure impulses from the well, a pipe coupling said pressure responsive device to the well, means for adjusting the effective length of said pipe to tune said pressure responsive device to one of the harmonics of echoes of said impulse received from the coupling collars of said tubing string, and means for measuring the frequency of said tubing collar echoes and for measuring the lapse of time between the creation of said impulse and the arrival at the pressure responsive device of the echo of said impulse from said obstruction.

3. In an apparatus for determining the location of an obstruction in a well having a string of assembled tubing sections therein, means communicating with said well for creating a pressure impulse in said well, a pressure responsive device for receiving pressure impulses from the well, a pipe coupling said pressure responsive device to the well, means for adjusting the effective length of said pipe to tune said pressure responsive device to one of the harmonics of echoes of said impulse received from the coupling collars of said tubing string, and means associated with said pressure responsive device for measuring the frequency of said tubing collar echoes and for counting the same and for measuring the lapse of time between the creation of said impulse and the arrival at the pressure responsive device of the echo of said impulse from said obstruction.

4. In an apparatus for determining the location of an obstruction in a well having a string of assembled tubing sections therein, means communicating with said well for creating a pressure impulse in said well, a pressure responsive device for receiving pressure impulses from the well, a means intercoupling said pressure responsive device with the well and having such effective length as to tune said pressure responsive device to one of the harmonics of echoes of said impulse received from the coupling collars of said tubing string, and means associated with said pressure responsive device for measuring the frequency of said tubing collar echoes and for counting the same and for measuring the lapse of time between the creation of said impulse and the arrival at the pressure responsive device of the echo of the impulse from said obstruction.

5. In an apparatus for determining the location of an obstruction in a well, means communicating with said well for creating a pressure impulse in the well, a pressure responsive device including diaphragm means, means coupling said diaphragm means to said well to allow the pressure of said well to press upon one face of said diaphragm means, means communicating between said coupling means and the opposite face of said diaphragm means for equalizing the static pressure on both sides of said diaphragm means whereby said diaphragm means will move in accordance with variation in pressure within said well, and means for measuring the lapse of time between the creation of said pressure impulse and the movement of said diaphragm means by the echo of said impulse from said obstruction.

6. In an apparatus for determining the location of an obstruction in a well, means communicating with said well for creating a pressure impulse in the well, a pressure responsive device including diaphragm means, means coupling said diaphragm means to said well to allow the pressure of said well to press upon one face of said diaphragm means, means defining a restricted by-pass intercommunicating the opposite face of said diaphragm means with said coupling means to equalize the static pressure on both faces of said diaphragm means whereby said diaphragm means will move in accordance with variation in pressure within said well, and means for measuring the lapse of time between the creation of said pressure impulse and the movement of said diaphragm means by the echo of said impulse from said obstruction.

7. In a device for determining the location of an obstruction in a well, means communicating with said well for creating a pressure impulse in said well, means for receiving and translating echoes received from said obstruction including diaphragm means, coupling means intercommunicating one face of said diaphragm means with said well, means defining a pressure equalizing chamber on the opposite face of said diaphragm, means defining a second chamber of greater volume communicating with said first chamber, valve means for restricting communication between said two chambers to vary the effective volume of the chamber exposed to said opposite face of said diaphragm means to control the sensitivity of response of said diaphragm means to pressure variation in said well, and means for measuring the lapse of time between the creation of said impulse and the movement of said diaphragm by the echo of said impulse from said obstruction.

8. In a device for measuring pressure waves in a fluid medium under static pressure, a diaphragm, a pressure-tight housing surrounding said diaphragm and having a window therein capable of passing light between the interior and exterior of the housing, said housing being divided by the diaphragm into two compartments, one on each side of the diaphragm, a medium entrance communicating with one compartment to directly expose one face of the diaphragm to the medium, a by-pass extending between the compartments to equalize the static pressure of the medium on opposite faces of the diaphragm, light-reflecting means associated with the diaphragm, means for directing a light beam upon said reflecting means to reflect the beam through said window, and means disposed exteriorly of said housing for receiving and translating the reflected beam.

9. In a device for measuring pressure waves in a fluid medium under static pressure, a diaphragm, a pressure-tight housing surrounding said diaphragm and having a window therein capable of passing light between the interior and exterior of the housing, said housing being divided by the diaphragm into two compartments, one on each side of the diaphragm, a medium entrance communicating with one compartment to directly expose one face of the diaphragm to the medium, a by-pass extending between the compartments to equalize the static pressure of the medium on opposite faces of the diaphragm, light-reflecting means associated with the diaphragm, means disposed exteriorly of the housing for directing a light beam through said window to strike said reflecting means and to be reflected thereby back through said window, and means disposed exteriorly of said housing for receiving and translating the reflected beam.

10. In a device for measuring pressure waves in a fluid medium under static pressure, a diaphragm, a pressure-tight housing surrounding said diaphragm and having a window therein capable of passing light between the interior and exterior of the housing, said housing being divided by the diaphragm into two compartments, one on each side of the diaphragm, a medium entrance communicating with one compartment to directly expose one face of the diaphragm to the medium, a by-pass extending between the compartments to equalize the static pressure of the medium on opposite faces of the diaphragm, light-reflecting means associated with the diaphragm, means for directing a light beam upon said reflecting means to reflect the beam through said window, means disposed exteriorly of said housing for receiving and translating the reflected beam, and means extending into said housing to adjust the position of said reflecting means to adjustably direct the reflected beam upon said receiving means.

11. In a device for measuring pressure waves in a fluid medium under static pressure, a diaphragm, a pressure-tight housing surrounding said diaphragm and having a window therein capable of passing light between the interior and exterior of the housing, said housing being divided by the diaphragm into two compartments, one on each side of the diaphragm, a medium entrance communicating with one compartment to directly expose one face of the diaphragm to the medium, a by-pass extending between the compartments to equalize the static pressure of the medium on opposite faces of the diaphragm, a light reflector associated with said diaphragm, means pivoting said reflector within the housing, means connecting said diaphragm and said reflector to move said reflector about its pivot in accordance with deflections of said diaphragm, means for projecting a beam of light upon said reflecting means to reflect said beam through said window, means disposed exteriorly of said housing for receiving and translating the reflected beam, and handle means projecting through said housing and accessible exteriorly thereof for adjusting said reflector pivot means to adjustably direct the reflected beam upon the receiving means.

12. In an apparatus for determining the location of an obstruction in a well having a string of assembled tubing sections therein, means communicating with said well for creating a pressure impulse in said well, a pressure responsive device for receiving pressure impulses from the well, means coupling said pressure responsive device to the well to expose said device to pressure variations existing in said well and having a length approximately a multiple of the length of a tubing section to tune said device to the frequency of the echoes of the impulse received from the couplings of the tubing string, and means associated with said device for recording the echoes from the tubing couplings and from said obstruction to permit counting the coupling echoes between the creation of the impulse and the echo from the unknown obstruction to determine its location.

13. In an apparatus for determining the unknown location of an obstruction in a well having a string of assembled tubing sections therein connected by couplings, means communicating with said well for creating a pressure impulse in said well to produce echoes of said impulse from the couplings and other obstructions in said well, echo receiving and registering means coupled to said well to expose said receiving and registering means to pressure variations produced in said well by echoes from said obstructions, and means associated with said receiving and registering means to accent the registration of tubing coupling echoes.

14. In an apparatus for determining the unknown location of an obstruction in a well having a string of assembled tubing sections therein connected by couplings, means communicating with said well for creating a pressure impulse in said well to produce echoes of said impulse from couplings and other obstructions in said well, pressure responsive echo receiving and registering means coupled to said well to expose said receiving and registering means to pressure variations in said well produced by echoes from said obstructions, and interference eliminating means associated with said receiving and registering means for limiting the response of said receiving and registering means to the registration of echoes from actual obstructions in the well whereby the registered echoes of the tubing couplings may be readily distinguished from each other and from the echoes from other actual obstructions in the well.

15. In an apparatus for determining the unknown location of an obstruction in a well having a string of assembled tubing sections therein connected by couplings, means communicating with said well for creating a pressure impulse in said well to produce echoes of said impulse from the couplings and other obstructions in said well, pressure responsive echo receiving and registering means coupled to said well to expose said receiving and registering means to the pressure variations produced in said well by echoes from said obstructions, and resonance means associated with said receiving and registering means to produce therein a natural acoustical period of oscillation so related to the frequency of the echoes from the tubing couplings as to accent the registration of the tubing coupling echoes.

16. In an apparatus for determining the unknown location of an obstruction in a well having a string of assembled tubing sections therein connected by couplings, means communicating with said well for creating therein a pressure impulse to produce echoes of said impulse from the couplings and other obstructions in the well, echo receiving and registering means including a pressure responsive device, and pipe means coupling said pressure responsive device to said well to expose said device to pressure variations in the well, and means for adjusting the effective length of said pipe means to produce a natural acoustical period of oscillation of said pressure responsive device so related to the frequency of the echoes of said tubing couplings as to accent the registration of said echoes.

17. In an apparatus for determining the unknown location of an obstruction in a well having a string of assembled tubing sections therein connected by couplings, means communicating with said well for creating therein a pressure impulse to produce echoes of said impulse from the couplings and other obstructions in said well, pressure responsive echo receiving and registering means having a natural frequency of oscillation so related to the frequency of the echoes from said tubing couplings as to accent the registration of said echoes, and means interconnecting said receiving and registering means to said well to expose said receiving and registering means to pressure variations in said well.

CRANFORD P. WALKER.

DISCLAIMER 2,156,519.—*Cranford P. Walker*, San Marino, Calif. MEANS FOR MEASURING THE LOCATION OF OBSTRUCTIONS IN WELLS. Patent dated May 2, 1939. Disclaimer filed Feb. 4, 1947, by the inventor.
 Hereby enters this disclaimer of claims 1, 13, 14, 15, and 17.
 [*Official Gazette March 11, 1947.*]